(12) United States Patent
Alt et al.

(10) Patent No.: US 10,612,460 B2
(45) Date of Patent: Apr. 7, 2020

(54) METHOD AND DEVICE FOR ROTATIONAL SPEED CONTROL OF AN ELECTRICALLY OPERATED SUPERCHARGING DEVICE FOR AN INTERNAL COMBUSTION ENGINE

(71) Applicant: Robert Bosch GmbH, Stuttgart (DE)

(72) Inventors: Benedikt Alt, Rutesheim (DE); Matthias Bitzer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/183,117

(22) Filed: Nov. 7, 2018

(65) Prior Publication Data

US 2019/0145309 A1 May 16, 2019

(30) Foreign Application Priority Data

Nov. 15, 2017 (DE) .................. 10 2017 220 404

(51) Int. Cl.
| | | |
|---|---|---|
| *F02B 39/10* | (2006.01) | |
| *F04D 25/06* | (2006.01) | |
| *F04D 27/02* | (2006.01) | |
| *F04D 25/02* | (2006.01) | |
| *F02D 41/00* | (2006.01) | |
| *F02B 37/10* | (2006.01) | |
| *F02B 37/12* | (2006.01) | |
| *F02B 39/16* | (2006.01) | |
| *F04D 27/00* | (2006.01) | |

(52) U.S. Cl.
CPC .............. *F02B 39/10* (2013.01); *F02B 37/10* (2013.01); *F02B 37/12* (2013.01); *F02B 39/16* (2013.01); *F02D 41/0007* (2013.01); *F04D 25/024* (2013.01); *F04D 25/0606* (2013.01); *F04D 27/004* (2013.01); *F04D 27/0261* (2013.01); *F02B 2037/122* (2013.01)

(58) Field of Classification Search
CPC .......... F02B 39/10; F02B 37/10; F02B 37/12; F02B 39/16; F02B 2037/122; F02D 41/0007; F04D 25/0606; F04D 27/0261; F04D 25/024; F04D 27/004
USPC .................................................... 60/598, 608
See application file for complete search history.

(56) References Cited

U.S. PATENT DOCUMENTS

| | | | | |
|---|---|---|---|---|
| 6,688,104 | B2* | 2/2004 | Baeuerle | F02D 13/0261 |
| | | | | 123/198 D |
| 7,210,296 | B2* | 5/2007 | Bolz | F02B 37/04 |
| | | | | 60/598 |
| 7,669,587 | B2* | 3/2010 | Guzzella | F01N 3/101 |
| | | | | 123/559.2 |

(Continued)

FOREIGN PATENT DOCUMENTS

DE 102004038156 A1 2/2006

*Primary Examiner* — Hoang M Nguyen
(74) *Attorney, Agent, or Firm* — Norton Rose Fulbright US LLP; Gerard Messina

(57) ABSTRACT

A method for operating a supercharging device for an internal combustion engine, the supercharging device being supported as an exhaust gas-driven supercharging device by an electric motor-driven supercharger drive or being operated exclusively by the electric motor-driven supercharger drive, the electric motor-driven supercharger drive being operated as a function of a setpoint actuating torque, the setpoint actuating torque being determined as a function of a pilot control torque from a pilot control unit and a control actuating torque from a rotational speed control unit.

10 Claims, 3 Drawing Sheets

(56) References Cited

U.S. PATENT DOCUMENTS

| | | | | |
|---|---|---|---|---|
| 2004/0112325 A1* | 6/2004 | Criddle | ................... | F02B 33/40 |
| | | | | 123/198 E |
| 2014/0123939 A1* | 5/2014 | Bevan | ..................... | F02B 39/04 |
| | | | | 123/337 |
| 2015/0345413 A1* | 12/2015 | Shawe | .................... | F02B 33/34 |
| | | | | 123/559.3 |

* cited by examiner

METHOD AND DEVICE FOR ROTATIONAL SPEED CONTROL OF AN ELECTRICALLY OPERATED SUPERCHARGING DEVICE FOR AN INTERNAL COMBUSTION ENGINE

CROSS REFERENCE

The present application claims the benefit under 35 U.S.C. § 119 of German Patent Application No. DE 102017220404.4 filed on Nov. 15, 2017, which is expressly incorporated herein by reference in its entirety.

FIELD

The present invention relates to engine systems including supercharged internal combustion engines, in particular the supercharging device being electrically operated with the aid of an electromechanical supercharger drive or supported by an electric motor. Furthermore, the present invention relates to measures for the rotational speed control of an electromechanical supercharger drive of such a supercharging device in the case of dynamic engine operation.

BACKGROUND INFORMATION

Within the scope of measures to downsize internal combustion engines, the displacement of the internal combustion engine is continuously reduced and the specific power output per liter is increased accordingly. In order to make this performance increase possible, an increased fuel quantity having an increased air-mass throughput is necessary.

The air-mass throughput may be increased by increasing the pressure in the intake manifold of the internal combustion engine with the aid of a supercharging device which is in particular exhaust gas-driven. A performance increase of supercharging devices of this type may be generally achieved by increasing the diameter of their exhaust gas turbines and their compressors. Also, this supercharging device must be capable of providing a constantly high charging pressure level across a high rotational speed range. In particular, in the case of lower rotational speeds, a supercharging device having an increased diameter of the turbine results in a deteriorated acceleration behavior.

In order to compensate for this disadvantage, the supercharging device may include an electromechanical supercharger drive for the purpose of supporting the exhaust gas-operated supercharging device with the aid of the electric motor or by designing the supercharging device completely in the form of an electrically operated supercharging device.

German Patent Application No. DE 10 2004 038 156 A1, for example, describes exhaust gas-operated supercharging devices operated, in general, based on an upstream supercharging pressure control unit which predefines a setpoint rotational speed of the compressor as the reference variable to provide a supercharging pressure required by the internal combustion engine. In the case of conventional exhaust gas-operated supercharging devices, this reference variable is set by manipulating a so-called supercharger actuator, such as a waste-gate valve or a VTG actuator. In the case of supercharging devices being supported by an electric motor or in the case of a supercharging device operated purely by an electric motor, this rotational speed is set with the aid of a rotational speed control of the supercharger drive. This rotational speed control predefines as the control variable an actuating torque in the form of a setpoint motor current which is used to actuate the supercharger drive directly in conjunction with a suitable pilot control, for example, or with the aid of a suitable current controller.

In the case of dynamic load curves, in particular, the supercharger drive is to be operated with the aid of the rotational speed device in such a way that the acceleration of the compressor of the supercharging device is made possible at a preferably steep rotational speed gradient.

SUMMARY

According to the present invention, a method for operating a supercharging device with the aid of an electromechanical supercharger drive for an internal combustion engine as well as a device and an engine system are provided.

Additional embodiments are described herein.

According to one first aspect of the present invention, a method for operating a supercharging device for an internal combustion engine is provided, the supercharging device being supported as an exhaust gas-operated supercharging device by an electric motor-driven supercharger or operated exclusively by the electric motor-driven supercharger, including the following steps:

carrying out a pilot control for providing a pilot control torque;

ascertaining a predicted rotational speed as a function of the pilot control torque;

carrying out a rotational speed control based on a control deviation between an actual rotational speed and the predicted rotational speed to provide a control actuating torque;

ascertaining a setpoint actuating torque as a function of the pilot control torque and the control actuating torque;

operating the supercharging device as a function of the setpoint actuating torque.

One aspect of the above-mentioned method is to add a pilot control, which considerably improves in particular the dynamic response behavior of the supercharging device, to a conventional rotational speed control for an electric supercharger drive. The pilot control ascertains from a setpoint rotational speed, which is usually provided by a supercharging pressure control unit, a corresponding pilot control current corresponding to a predefined mathematical model. For the dynamic pilot control, the mathematical model takes into account the model parameters, in particular the torque of inertia and the load torque at the compressor shaft of the supercharging device.

In this way, it is possible to provide an approach for the rotational speed control of an electric supercharger drive for a supercharging device with the support of an electric motor or with the aid of a completely electrically operated supercharging device for the purpose of achieving a higher dynamic. Based on the model-based dynamic pilot control, a more rapid start-up behavior is to be achieved in particular in the case of a rapid change in the setpoint value as compared to an approach involving a rotational speed control without a pilot control. For this purpose, the setpoint rotational speed is transformed into a modeled setpoint motor current with the aid of the dynamic pilot control, the steady-state behavior as well as the dynamic behavior of the supercharging device being taken into account.

Likewise, the current limitations of the electric supercharger drive may be taken into account. With the aid of the model-based dynamic pilot control, a predicted trajectory may be additionally computed which predicts on the basis of the dynamic model and, potentially, under control variable limitations as to how the rotational speed of the supercharging device is going to behave. Moreover, it is possible that the rotational speed control unit only corrects a possible deviation between the trajectory and the actual rotational speed, so that the rotational speed control unit is considerably relieved. Here, it must be noted that potentially present down times or run time differences between the rotational speed trajectory and the measured actual rotational speed must be corrected in order to prevent unnecessary interventions by the controller.

Furthermore, a setpoint rotational speed may be provided by a supercharging pressure control unit, the pilot control being carried out as a function of the setpoint rotational speed.

It may be provided that the setpoint actuating torque is ascertained as the setpoint actuating current which is set by a current control unit for operating the electric motor-driven supercharger drive.

It may be in particular provided that the setpoint actuating current only provides the torque-forming current portion. In this way, only the stator magnetic field portion of the supercharger drive advancing the electric rotor position by 90° is set by the setpoint actuating current.

Furthermore, the pilot control unit may include a dynamic filter which converts a setpoint rotational speed as a function of a torque of inertia into the pilot control torque and changes the setpoint rotational speed predefined by the supercharging pressure control unit into a rotational speed trajectory for the pilot control and/or the control of the electrically supported supercharger drive.

According to one specific embodiment, the ascertainment of the setpoint actuating torque may be carried out as a function of a modeled load torque, the load torque being determined in particular as a function of an engine temperature and/or a correction factor.

It may be provided that the setpoint actuating torque is ascertained by delimiting to a predefined minimum torque value and/or a predefined maximum torque value.

According to another aspect, a device, in particular a control unit, for operating a supercharging device for an internal combustion engine is provided, the supercharging device being supported as an exhaust gas-driven supercharging device by an electric motor-driven supercharger drive or being operated exclusively by the electric motor-driven supercharger drive, the device being designed to operate the electric motor-driven supercharger drive as a function of a setpoint actuating torque and to determine the setpoint actuating torque as a function of a pilot control torque from a pilot control unit and a control actuating torque from a rotational speed control unit.

BRIEF DESCRIPTION OF THE DRAWINGS

Specific embodiments are explained in greater detail below based on the figures.

DETAILED DESCRIPTION OF EXAMPLE EMBODIMENTS

Figure 1:
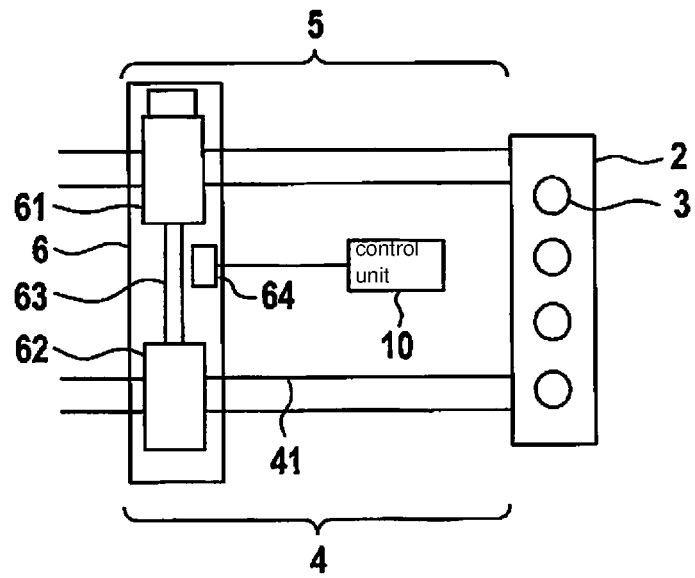
FIG. 1 shows a schematic illustration of an engine system including an internal combustion engine which is provided with fresh air under an increased supercharging pressure with the aid of a supercharging device.

FIG. 1 schematically shows an illustration of an engine system including an internal combustion engine 2 which is in particular designed as a reciprocating piston engine. Internal combustion engine 2 includes a number of cylinders 3 which are supplied with fresh air via an air supply system 4. Internal combustion engine 2 is operated according to a four-stroke principle, combustion exhaust gases being ejected into an exhaust gas discharge section 5 following a combustion stroke.

Furthermore, a supercharging device 6 may be provided which includes an exhaust gas turbine 61 in exhaust gas discharge section 5 and a compressor 62 in air supply system 4. Exhaust gas turbine 61 is driven by the combustion exhaust gas and, in the process, converts exhaust gas enthalpy into rotatory kinetic energy of a coupling shaft 63. Compressor 62 is driven by being mechanically coupled to exhaust gas turbine 61 via coupling shaft 63, so that fresh air is drawn from the surroundings and provided in an intake manifold section 41 under a supercharging pressure.

To increase the dynamic of supercharging device 6, a supercharger motor, which electromechanically introduces additional energy to supercharging device 6, may be situated at coupling shaft 63 for the purpose of achieving a more rapid acceleration behavior of supercharging device 6, in particular of the compressor. While a conventional supercharging pressure control unit affects a supercharger actuator 64 situated on the side of exhaust gas turbine 61 in order to establish the amount of the exhaust gas enthalpy to be implemented in exhaust gas turbine 61, the provision of supercharger drive 64 requires an additional rotational speed control unit which adjusts the rotational speed of compressor 62 as a function of a setpoint supercharger rotational speed $N_s$, which is predefined by the supercharging pressure control unit.

In another specific embodiment, supercharging device 6 may only include one compressor 62 which is driven exclusively by a supercharger drive 64. The conversion of exhaust gas enthalpy into kinetic energy for driving compressor 62 may be dispensed with in this case.

Supercharger drive 64 may be designed as an electronically commutated electric machine which may be in particular designed to have multiple phases. Phase voltages are applied to the phase conductors of the electric machine corresponding to a commutation pattern according to a sinus commutation or a block commutation. In this case, the phase voltages are determined corresponding to a field-oriented current control which generates phase voltages as a function of a(n) (electric) rotor position of the electric machine and, potentially, as a function of the rotational speed (due to field weakening operation), in order to provide a torque corresponding to a setpoint actuating torque.

Supercharger drive 64 is actuated with the aid of a control unit 10. Control unit 10 implements a function of a supercharging pressure control in a conventional manner. As the control variable, a setpoint supercharger rotational speed $N_s$ is predefined which represents a reference variable for a rotational speed control of supercharging device 6. This rotational speed control provides a setpoint actuating torque $M_s$ as the reference variable for the field-oriented control.

Setpoint actuating torque $M_s$ may in particular represent an indication with regard to a torque-forming setpoint current.

Figure 2:
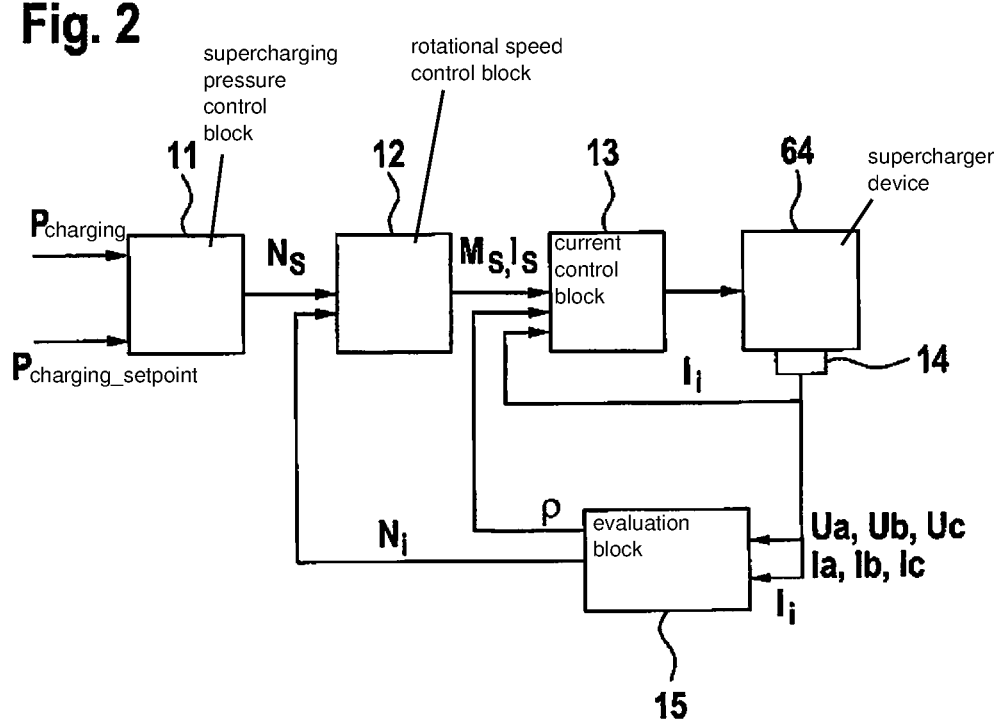
FIG. 2 shows a schematic block diagram to illustrate the actuation of the supercharger motor with the aid of a rotational speed control unit.

For a detailed description of the function implemented by control unit 10, reference is made to the block diagram of FIG. 2.

In FIG. 2, a setpoint rotational speed $N_s$ is implemented as the control variable based on a predefined supercharging pressure $P_{charging\_setpoint}$ and measured supercharging pressure $P_{charging}$ in a supercharging pressure control block 11. This takes place in a conventional manner by taking into account an engine torque to be provided by internal combustion engine 2.

Setpoint rotational speed $N_s$ is fed as a reference variable to a rotational speed control block 12 which provides a variable of a setpoint motor current $I_s$, in particular, which is equivalent to setpoint actuating torque $M_s$ for controlling supercharger drive 64. In a current control block 13, the motor current or the phase currents of supercharger drive 64 are determined based on predefined setpoint actuating torque $M_s$. By phase current measurements with the aid of suitable sensors 14, actual phase currents Ia, Ib, Ic may be ascertained which are also fed to current control block 13 in order to obtain an indication with regard to actual motor current $I_i$.

Furthermore, an evaluation block 15 may be provided in order to detect without the use of sensors the position of supercharger drive 64 which ascertains based on phase voltages Ua, Ub, Uc additionally measured by sensors 14 and, potentially, measured phase currents Ia, Ib, Ic an actual rotational speed $N_i$ and feeds same to rotational speed control block 12.

Furthermore, a rotor position ρ may be ascertained in evaluation block 15 from measured phase voltages Ua, Ub, Uc according to conventional methods. Such methods may, for example, be based on an ascertainment of points in time of a zero crossing of an induced voltage of a de-energized phase conductor (back EMF methods and the like). Rotor position ρ is fed to current control block 13, so that based on rotor position ρ of supercharger drive 64, the phase voltages of supercharger drive 64 may be correspondingly determined according to the conventional field-oriented control.

Figure 3:
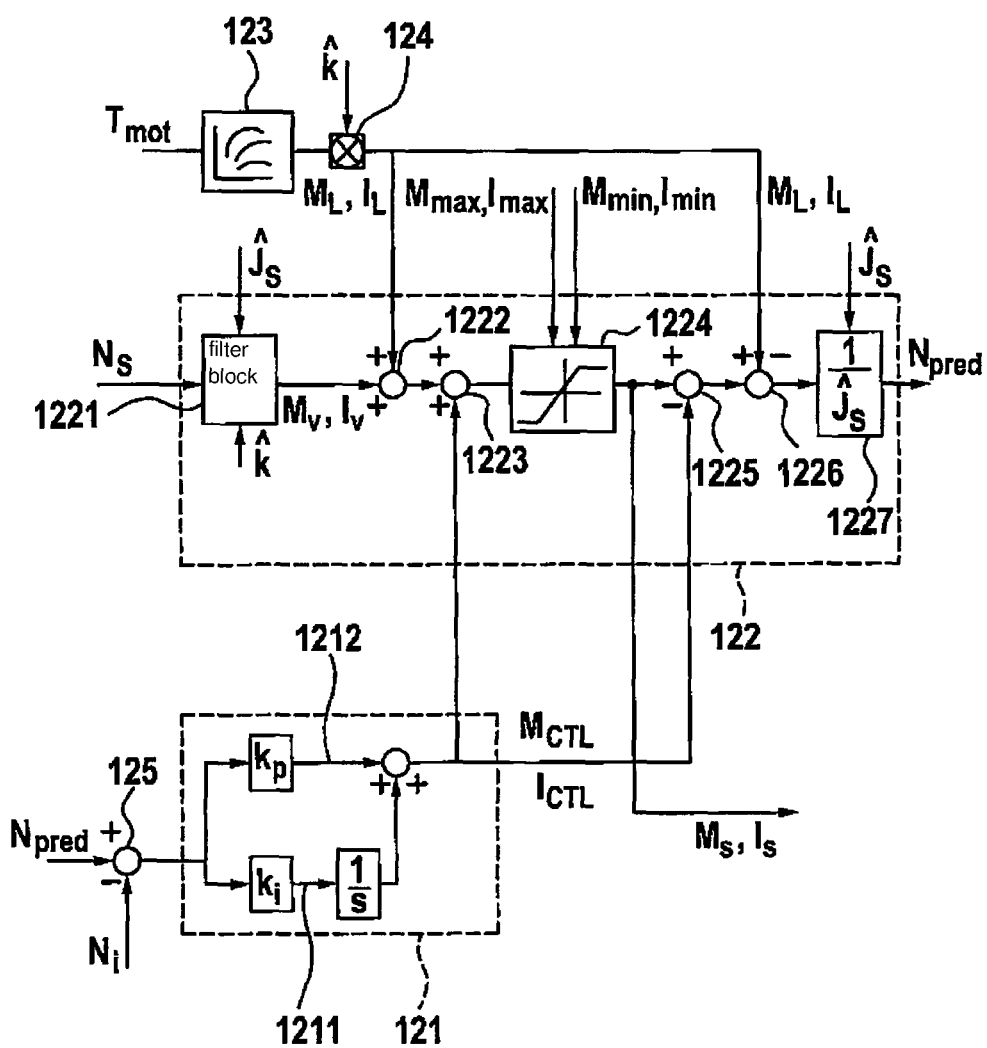
FIG. 3 shows a function illustration of the rotational speed control unit of FIG. 2 including a pilot control.

One possible specific embodiment of rotational speed control block 12 is illustrated in greater detail in FIG. 3. Rotational speed control block 12 essentially includes a rotational speed control unit 121 and a pilot control unit 122. Rotational speed control 121 is illustrated in the form of a PI controller, predefined proportionality constant $k_p$ and integration constant $k_i$ being taken into account in parallel control sub-branches 1211, 1212. On the input side of rotational speed control unit 121, a difference is fed (with the aid of subtraction element 125) from a rotational speed $N_{pred}$ which is a function of and predicted by a predefined setpoint rotational speed $N_s$, and an actual rotational speed $N_i$. On the output side, a control portion is output as a control actuating torque $M_{ctl}$ or as a control actuating current $I_{ctl}$ to pilot control unit 122.

Predefined setpoint rotational speed $N_s$ is fed to pilot control unit 122 from supercharging pressure control block 11. Setpoint rotational speed $N_s$ is fed to a filter block 1221 with the aid of a dynamic filter in order to obtain an indicated torque as pilot control torque $M_v$ in particular in the form of a pilot control current $I_v$. To the latter is added a load torque portion $M_L$, which is determined on engine temperature $T_{mot}$ and a correction factor $k^\wedge$, for example, in the form of a load torque current $I_L$ in a first adding element 1222. Load torque portion $M_L$ or load torque current $I_L$ results, for example, from a provided engine temperature $T_{mot}$ with the aid of a predefined characteristic map 123 and a multiplying element 124.

In a second adding element 1223, the output of first adding element 1222 is added the control portion in the form of control actuating torque $M_{ctl}$ or control actuating current $I_{ctl}$.

The result of second adding element 1223 is delimited to predefined maximum and/or minimum torque values $M_{max}$, $M_{min}$ or corresponding current values $I_{max}$, $I_{min}$, in a delimiting block 1224. On the output side of delimiting block 1224, setpoint actuating torque $M_s$ or setpoint actuating current $I_s$ are made available.

In order to obtain predicted rotational speed value $N_{pred}$ from modeled setpoint actuating torque $M_s$ and setpoint motor current $I_s$, load torque portion $M_L$ in the form of a load torque current $I_L$ is subtracted from setpoint motor current $I_s$ and from setpoint actuating torque $M_s$ with the aid of a second subtracting element 1225 and control actuating torque $M_{ctl}$ and control actuating current $I_{ctl}$ are subtracted again from setpoint actuating torque $M_s$ and from setpoint motor current $I_s$ with the aid of a third subtracting element 1226, and transformed into a rotational speed signal using a dynamic system model in a system modeling block 1227.

The dynamic filter of filter block 1221 which transforms setpoint rotational speed $N_s$ into a setpoint value for pilot control torque $M_v$ or pilot control current $I_v$ into torque-forming current is equally a function of the mass torque of inertia $\hat{J}_S$ and load torque $M_L$ of supercharging device 6 as is the dynamic system. The model parameters, mass torque of inertia $\hat{J}_S$, and load torque $M_L$ may be, for example, ascertained experimentally within the scope of bench tests. Characteristic map 123 may be used to adapt the load torque to the friction which may change as a function of other parameters, for example engine temperature $T_{mot}$ (oil temperature) of internal combustion engine 2.

If setpoint actuating torque $M_s$ is indicated as setpoint motor current $I_s$, it is preferably possible that setpoint motor current $I_s$ only preferably corresponds to that current portion which is torque-forming. In particular, the current portion is established as the q portion in a rotor-fixed coordinate system, the so-called d-q coordinate system. Here, the q portion corresponds to a current vector advancing the electric rotor position by 90°.

Figure 4:
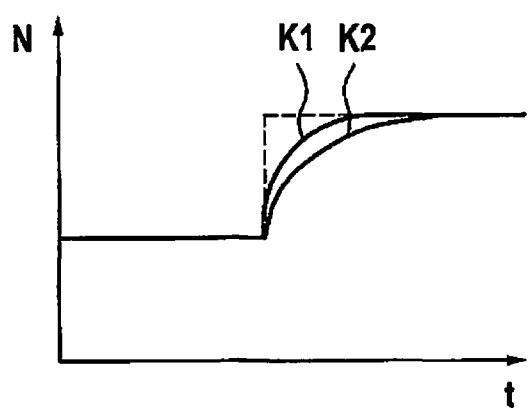
FIG. 4 shows diagrams to illustrate the controller behavior in the case of an abrupt change in the profile of a setpoint rotational speed with regard to the actual rotational speed and the motor current in the case of a rotational speed control including a pilot control as well as in the case of a rotational speed control without a pilot control.
Figure 4:
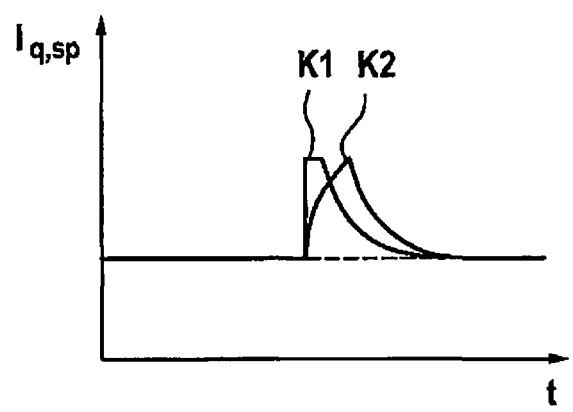

In FIG. 4, diagrams are illustrated which illustrate the chronological profiles of engine rotational speed N and of motor current I as a predefined current of setpoint rotational speed $N_s$ in the case of a rotational speed control including pilot control (curve K1) and without pilot control (curve K2). A more rapid increase in engine rotational speed N and an immediate response by setpoint motor current I to an abrupt change in the profile of setpoint rotational speed $N_s$ is apparent.

What is claimed is:

1. A method for operating a supercharging device for an internal combustion engine, the supercharging device being supported as an exhaust gas-driven supercharging device by an electric motor-driven supercharger drive or operated exclusively by the electric motor-driven supercharger drive, the method comprising:

operating the electric motor-driven supercharger drive as a function of a setpoint actuating torque, the setpoint actuating torque being determined as a function of a pilot control torque from a pilot control unit and a control actuating torque from a rotational speed control unit.

2. The method as recited in claim 1, further comprising:
carrying out a pilot control for providing the pilot control torque;
ascertaining a predicted rotational speed as a function of the pilot control torque;
carrying out a rotational speed control based on a control deviation between an actual rotational speed and the predicted rotational speed to provide the control actuating torque; and
ascertaining the setpoint actuating torque as a function of the pilot control torque and the control actuating torque.

3. The method as recited in claim 1, wherein a setpoint rotational speed is made available by a supercharging pressure control unit, the pilot control being carried out as a function of the setpoint rotational speed.

4. The method as recited in claim 1, wherein the setpoint actuating torque is ascertained as a setpoint actuating current which is set by a pilot control unit or a current control unit for operating the electric motor-driven supercharger drive.

5. The method as recited in claim 4, wherein the setpoint actuating current indicates only a torque-forming current portion.

6. The method as recited in claim 1, wherein the pilot control unit includes a dynamic filter which converts a setpoint rotational speed as a function of a torque of inertia into the pilot control torque and changes the setpoint rotational speed predefined by the supercharging pressure control unit into at least one of: (i) a rotational speed trajectory for a pilot control, and/or (ii) a rotational speed control of the electrically supported supercharger drive.

7. The method as recited in claim 1, wherein the ascertainment of the setpoint actuating torque is carried out as a function of a modeled load torque, the load torque being determined as a function of an engine temperature and/or a correction factor.

8. The method as recited in claim 1, wherein the setpoint actuating torque is ascertained by delimitation to a predefined minimum torque value and/or a predefined maximum torque value.

9. A control unit for operating a supercharging device for an internal combustion engine, the supercharging device being supported as an exhaust gas-driven supercharging device by an electric motor-driven supercharger drive or is operated exclusively by the electric motor-driven supercharger drive, the control unit being configured to operate the electric motor-driven supercharger drive as a function of a setpoint actuating torque and to determine the setpoint actuating torque as a function of a pilot control torque from a pilot control unit and a control actuating torque from a rotational speed control unit.

10. A non-transitory machine-readable memory medium on which is stored a computer program for operating a supercharging device for an internal combustion engine, the supercharging device being supported as an exhaust gas-driven supercharging device by an electric motor-driven supercharger drive or operated exclusively by the electric motor-driven supercharger drive, the computer program, when executed by a computer, causing the computer to perform:
operating the electric motor-driven supercharger drive as a function of a setpoint actuating torque, the setpoint actuating torque being determined as a function of a pilot control torque from a pilot control unit and a control actuating torque from a rotational speed control unit.

* * * * *